June 5, 1923.

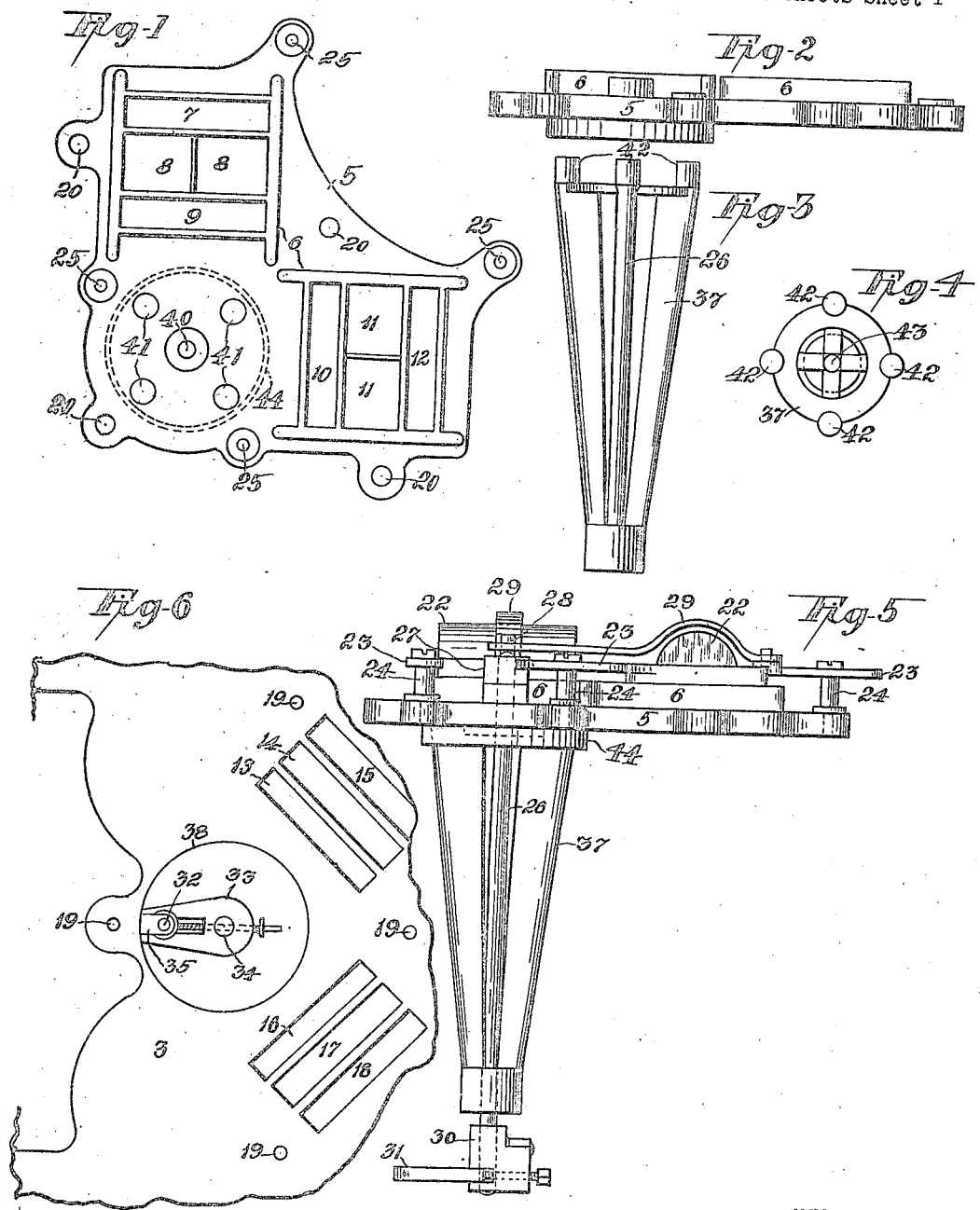

H. H. SPRAGUE

GAS METER

Filed July 14, 1921

INVENTOR.
Henry H. Sprague
Geo. D. Phillips
BY

ATTORNEY.

Patented June 5, 1923.

1,458,010

UNITED STATES PATENT OFFICE.

HENRY H. SPRAGUE, OF BRIDGEPORT, CONNECTICUT, ASSIGNOR TO THE SPRAGUE METER COMPANY, OF BRIDGEPORT, CONNECTICUT.

GAS METER.

Application filed July 14, 1921. Serial No. 484,549.

*To all whom it may concern:*

Be it known that I, HENRY H. SPRAGUE, citizen of the United States, residing at Bridgeport, in the county of Fairfield and State of Connecticut, have invented certain new and useful Improvements in Gas Meters; and I do hereby declare the following to be a full, clear, and exact description of the invention, such as will enable others skilled in the art to which it appertains to make and use the same.

This invention relates to gas meters, and particularly to the valve mechanism, it being an improvement on my former patents of March 10, 1903, No. 722,389, and August 28, 1917, No. 1,238,453. In these patents it will be noted that the crank shaft bracket is a separate unit attached to the body of the meter, which made it difficult to insure a proper workable alignment of the crank shaft with the internal diaphragm actuating mechanism and the proper throw or travel of the valves with respect to the valve seat ports. This arrangement made it difficult to assemble the valve mechanism separately with respect to the diaphragm mechanism within the meter body.

The present improvement overcomes the former trouble in that the crank shaft bracket, crank shaft, valve seats, and other operative parts connected with the crank shaft, are assembled as a unit ready to be attached to the meter body. This arrangement not only reduces the costs of assembling in meter construction, but the assembled unit, which constitutes the principal wearing parts of the meter, can be furnished to customers at a low cost to replace the worn out valve mechanism.

Referring to the accompanying drawings wherein the same reference characters indicate like parts throughout the several views;

Figure 1 represents a full size detail view of the valve seat base and valve seats integral therewith;

Figure 2 is a full size detail elevation of Figure 1;

Figure 3 is a full size detail elevation of the crank shaft bracket;

Figure 4 is a full size detail plan view of the bracket;

Figure 5 is a full size view of the several parts connected with the crank shaft assembled as a unit;

Figure 6 is a full size broken view of the top of the meter body;

A brief description of the well known elements of the meter may be necessary for a better understanding of the improved features.

1 represents the meter body having the threaded holes 2 for the attaching screws of one of the recessed side covers, not shown. 3 is the upper surface of the meter having the threaded holes 4 for the attaching screws of the cover forming the gas distributing chamber, not shown, the upper surface 3 forming the floor of the chamber when the cover is attached to the body.

Figure 7:
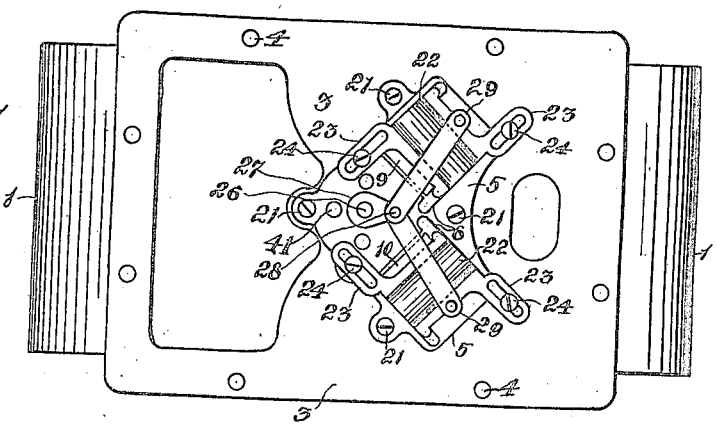
Figure 7 is a reduced plan view of the meter body with the recessed cover forming the gas distributing chamber and the recessed side covers of the meter body removed to show the valve mechanism in operative position.

5 is the removable valve seat base having the raised valve seats 6, integral with the base and having the gas ports 7, 8, 9, 10, 11 and 12, Figure 1, adapted to register with the ports 13, 14, 15, 16, 17, and 18, Figure 6, formed in the upper surface 3. The threaded holes 19 are adapted to register with the holes 20 of the base for the screws 21, Figure 7, by means of which the base is secured to upper surface 3 of the body of the meter.

22 are the valves operatively mounted on the seats 6 and the slotted projections 23 operatively embrace the screws 24, secured in the threaded holes 25, Figure 1, of the base 5. 26 is the crank shaft carrying at its upper end the crank 27 and crank pin 28, to the latter of which the valve links 29 are pivoted. The usual crank adjustment comprising the support 30 and adjustable crank arm 31 engage the crank pin 32 of the crank 33 mounted on the lower crank shaft 34. 35 and 36 are broken views of the links connecting the upper and lower crank shafts with the well known meter diaphragm mechanism, not shown.

The improved feature relates particularly to the method of assembling the valve mechanism comprising the valves 22, valve seat base 5, crank shaft bracket 37, and the crank adjustment support 30 of the crank shaft, into a complete workable unit, Figure 5, before connecting it to the meter.

Figure 8:
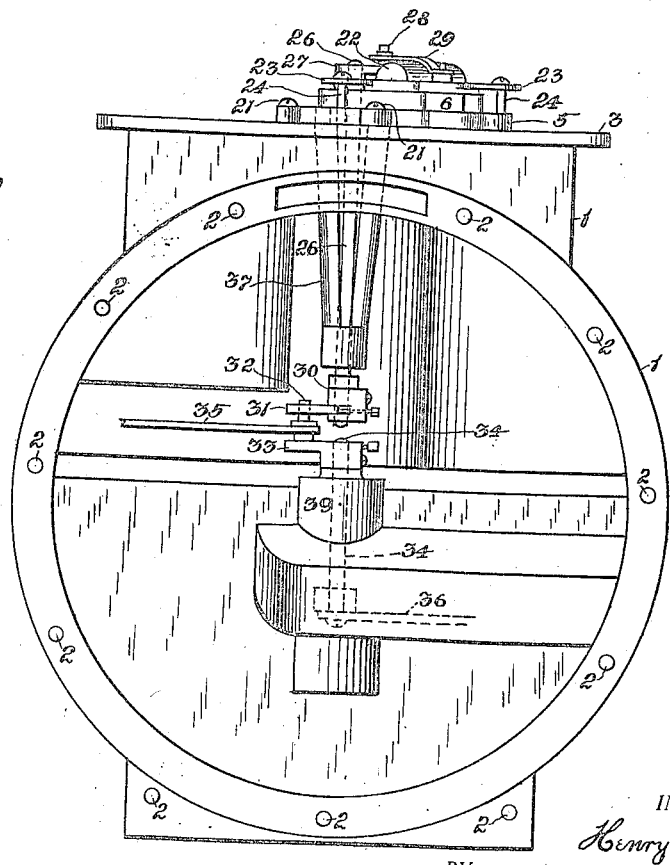
Figure 8 is a reduced view of the meter body with the gas distributing cover and side covers of the body removed.

With the proper jig, the large opening 38, Figure 6, is formed in the upper surface 3, and from this opening, with the proper jig, a hole is made through the base 39, Figure 8, as a bearing for the lower crank shaft 34, and in axial alignment with said opening. The holes 19 are also made in the meter top 3 for the valve base attaching screws 21, Figure 7.

The holes 20 in the base are made to register with the holes 19, and the hole 40 is made for the crank shaft 26. The holes 41 in the base are made to receive the bracket locating studs 42, Figure 3, of the bracket 37 which is thus firmly secured to the base with the lower crank shaft hole 43, Figure 4, of the bracket in alignment with the hole 40 of the base. The curb 44, Figures 1, 2 and 5, projects from the under surface of the base adapted to register with the large opening 38 in the top 3, and thus accurately locate the assembled unit with respect to the internal operative mechanism of the meter without further adjustment.

As before mentioned, connecting the crank shaft bracket to the valve seat base, and assembling the entire valve mechanism, including the elements of the crank adjustment, into a unit ready to be readily connected to the internal diaphragm mechanism of the meter, instead of connecting these elements separately to the meter, as heretofore, is not only more economical in meter construction, but as before mentioned, the assembled unit can be supplied to customers at a reduced cost ready to replace the correspondingly worn out parts.

There is both economy in construction and more accurate results obtained in making the crank shaft bracket and valve seat base separate and connecting them together than making them in one piece, for when the two elements are assembled, they are, for all practicable purpose, integral.

Having thus described my invention what I claim is:—

1. A gas meter body having a raised surface to form a floor for a gas distributing chamber and having gas ports therethrough, a detachable valve seat base having raised seats and ports registering with the floor ports, valves for the seats, said floor having an opening therethrough, said base having a curb for said opening, a bracket located within the curb and detachably secured to the base, and a crank shaft operatively connected to the valves and journaled in the bracket.

2. In combination with a gas meter body having an upper surface with gas ports therethrough, valve mechanism comprising a base having valve seats with gas ports adapted to register with the gas ports of said upper surface of the body, valves for the seats, a bracket secured to and depending from said base, a shaft journaled in the bracket, a crank on one end operatively connected with the valves, said bracket adapted to project into the meter body, and a crank at the opposite end of the shaft adapted to connect with mechanism within the meter, said valve mechanism and bracket assembled into a workable unit previous to its installation in the meter.

In testimony whereof I affix my signature.

HENRY H. SPRAGUE.